United States Patent Office 3,070,508
Patented Dec. 25, 1962

3,070,508
METHOD FOR RENDERING NICOTINAMIDE PALATABLE
Sheldon Siegel, Westfield, Russell H. Pettebone, Fanwood, and Edward J. Hanus, Palisade, N.J., assignors to Merck & Co., Inc., Rahway, N.J., a corporation of New Jersey
No Drawing. Filed June 10, 1959, Ser. No. 819,231
5 Claims. (Cl. 167—81)

This invention relates to pharmaceutical compositions and more particularly to adsorption compounds of nicotinamide which are substantially tasteless.

The use of nicotinamide for the treatment and prevention of certain diseases and in human and animal nutrition generally, is well known. However, nicotinamide is difficult to formulate into palatable product and requires special compounding techniques because of its inherently unpleasant taste. Various types of formulations have been suggested to overcome the taste problems but for the most part these formulations are not completely satisfactory. In general the taste problem has been attacked by various techniques which are aimed at masking the taste of the nicotinamide by substituting for its undesirable and unpalatable flavor an overriding or overwhelming flavor which is somewhat more agreeable to one taking the nicotinamide. These techniques include the use of flavoring agents in tableting or capsule-coating operations and the use of various flavoring solutions and emlusions.

However, the addition of a masking flavor is not a completely satisfactory technique because the objectionable flavor of the nicotinamide in most instances manifests itself in the phenomenon of after-taste. Thus, masking the flavor of nicotinamide is only partly effective in solving the flavor problem.

It is an object of this invention to provide a composition in which the disagreeable flavor of nicotinamide is absent. Another object of this invention is to provide nicotinamide compositions which are substantially tasteless. A further object of this invention is to provide nicotinamide compositions which may be formulated without concern for their taste. Other objects of this invention will become apparent hereinafter.

In accordance with the present invention, it has been found that by contacting a synthetic cation exchange resin with nicotinamide there is produced a stable nicotinamide resin adsorbate which is substantially tasteless. Furthermore, it has been found that the nicotinamide in this form is particularly well adsorbed when administered orally and can be readily incorporated into various pharmaceutical formulations without concern for their taste.

The resin adsorption compositions of this invention are preferable prepared by contacting a synthetic cation exchange resin of suitable low toxicity with nicotinamide in the form of an aqueous solution utilizing sufficient resin to adsorb the major part of the nicotinamide. The resulting suspension is then agitated at room temperature, that is, from about 15° to about 25° C. (although satisfactory results are obtained at materially higher and lower temperatures) until substantially no more nicotinamide is adsorbed. The solid product is then filtered, washed and dried to constant weight.

The synthetic cation exchange resin which may be used to prepare the products of this invention should of course be non-toxic since they are to be administered orally together with the nicotinamide. However, this presents no problem since a small amount of resin is capable of adsorbing sufficient nicotinamide necessary for a therapeutical effective dose. Synthetic cation exchange resins which derive their exchange activity essentially from weakly acidic or strongly acidic groups may be used. Such resins are generally referred to in the art as weakly acidic or strongly acidic cation exchange resins. The composition of the resin matrix to which the active groups are attached is relatively unimportant so long as the matrix is such that the resin is rendered insoluble in ordinary solvents. Synthetic cation exchange resins which derive their exchange activity from sulfonic acid groups are particularly useful and preferred. Resins which are copolymers of sulfonated polystyrene and polyvinyl aromatic compounds, such as divinylbenzene may be used. A number of these resins are available commercially from the Dow Chemical Company under the name "Dowex," e.g. Dowex 50, Dowex 50W and so forth. These resins contain varying proportions of divinylbenzene as the cross linking component. Resins of this type are described in U.S. Patent 2,366,007. Synthetic cation exchange resins which derive their exchange activity from carboxylic acid groups are also useful. Resins which are polyacrylic acid or polymethacrylic acid in which the molecules are cross linked with polyvinyl aromatic compounds, such as divinylbenzene may be used. Resins of this type are described in U.S. Patent 2,340,111. A number of these resins are available commercially from the Rohm & Haas Company under the name "Amberlites," e.g. Amberlite IRC-50, Amberlite X-64, Amberlite XE-97, Amberlite X-89 and so forth. In each case it is, of course, essential that no undesirable taste be imparted into the compositions of this invention by the resin material itself. With this requirement in mind any of the above mentioned resins would be suitable for use in the compositions of the instant invention.

Examples of the preparation of the product will make the procedures clear. It is to be understood, however, that the examples are intended for purposes of illustration only and are not intended as in any way limiting the scope of this invention, which is defined in the appended claims

Example I 20 grams of Amberlite XE-64 ion exchange resin acid form was washed with water. To the wet resin was added a solution containing 20 grams of nicotinamide dissolved in 400 milliliters of water and the resulting suspension agitated at 25° C. for 18 hours. The resin material was filtered and washed first with water and then with acetone. The product was then dried under vacuum at 80° C. for 3 hours. The dried white resin adsorbate was found to contain 25% by weight nicotinamide and was substantially tasteless.

Example II 20 grams of a sulfonated copolymer of polystyrene and approximately 8% by weight of divinylbenzene (available as Dowex 50W-X8) in acid form was washed with water. To the wet resin was added a solution containing 20 grams of nicotinamide dissolved in 400 milliliters of water and the resulting suspension agitated at 25° C. for 24 hours. The resin material was filtered, washed first with water, then with acetone and then dried under vacuum at 80° C. for 3 hours. The dried tan resin adsorbate contained 50% by weight nicotinamide and was substantially tasteless.

Although the amount of nicotinamide adsorbed on the resin varies depending on the conditions employed especially on the ratio of nicotinamide to adsorbing resin, it has been found that compositions of nicotinamide adsorbed on the resin in which the content of nicotinamide in the dried final product amounted to 10% to 60% are substantially tasteless and quite satisfactory for incorporation into various pharmaceutical dosage forms.

The compositions of this invention can be used as such, which is substantially moisture-free form or they can be intermixed with other pharmaceutical ingredients or excipients. For example, it may desired to give it in capsules, pills, tablets, or even as a powder. It can be intermixed with flavoring agents, sweetening agents, binders and other materials of this type. However, the inclusion of flavoring agents or sweetening agents is not at all necessary and might be dispensed with, if desired, since the composition would be otherwise substantially tasteless. Because of the objectionable taste of the nicotinamide used, the compositions of this invention are particularly useful in the form of chewable tablets.

Various changes and modifications of the invention can be made, and to the extent that such variations incorporate the spirit of the instant invention, they are intended to be included within the scope of the appended claims.

What is claimed is:

1. A method for rendering unpleasant tasting nicotinamide palatable which comprises contacting a solution of nicotinamide with a substantially tasteless, pharmaceutically and medically acceptable synthetic cation exchange resin to form a nicotinamide resin adsorbate and then drying said resin adsorbate until substantially dry, thereby forming a palatable form of nicotinamide which remains palatable when chewed.

2. The method of claim 1 wherein the resin is a strongly acidic cation exchange resin.

3. The method of claim 2 wherein the resin is a copolymer of sulfonated polystyrene and divinylbenzene.

4. The method of claim 1 wherein the resin is a weekly acidic cation exchange resin.

5. The method of claim 4 wherein the resin is a copolymer of methacrylic acid and divinylbenzene.

References Cited in the file of this patent

UNITED STATES PATENTS

| | | |
|---|---|---|
| 2,673,827 | Kohlstaedt | Mar. 30, 1954 |
| 2,697,059 | Gustus | Dec. 14, 1954 |
| 2,830,933 | Bouchard | Apr. 15, 1958 |
| 2,990,332 | Keating | June 27, 1961 |

OTHER REFERENCES

Chem. Abs., vol. 50, 1956, p. 7399 (Industrie chim. belge, vol. 20, Spec. No. 468–72 (1955).

Abrahams: The Lancet, II:7009, December 28, 1957, pp. 1317–8.

Chaudhry: J. Pharm. and Pharm., vol. 8, November 1956, pp. 975–986.

Kato: Science, vol. 114, 1951, p. 12.